May 18, 1943. H. G. ADLER 2,319,654
GOVERNOR STRUCTURE
Filed Oct. 27, 1941 3 Sheets-Sheet 1

INVENTOR.
HERMAN G. ADLER
BY
ATTORNEYS

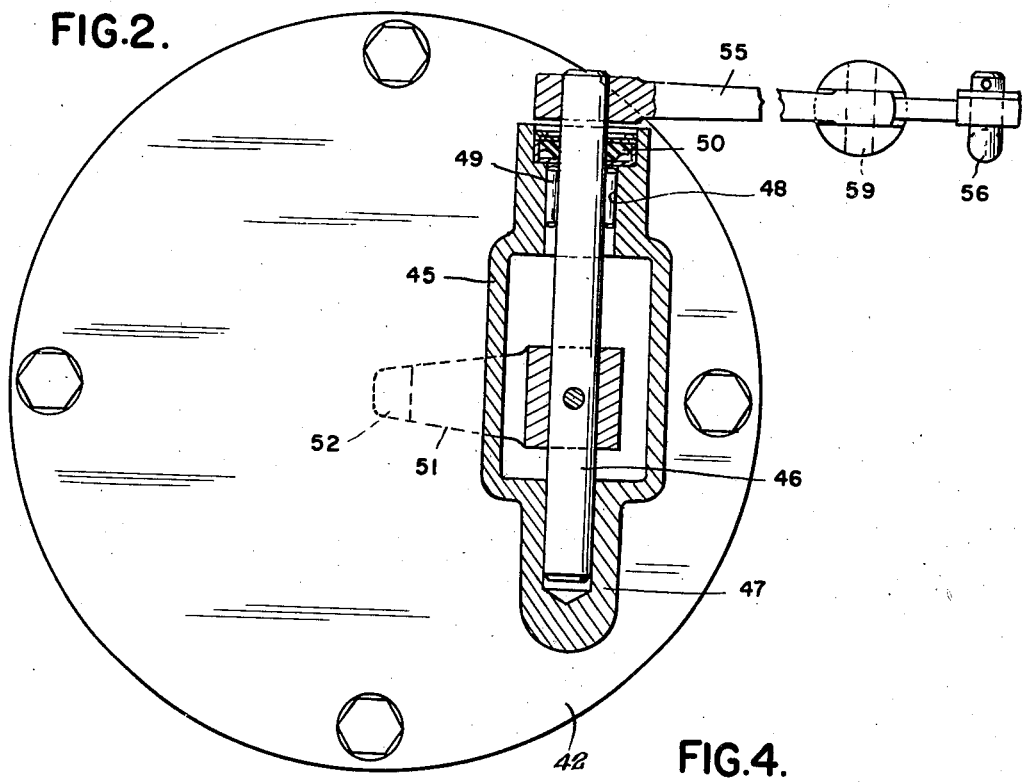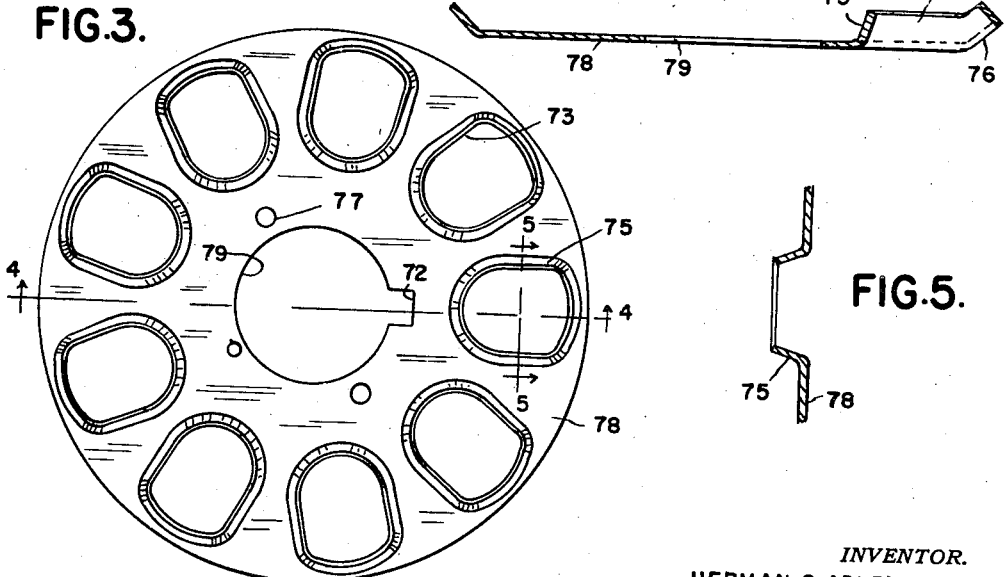

May 18, 1943.  H. G. ADLER  2,319,654
GOVERNOR STRUCTURE
Filed Oct. 27, 1941  3 Sheets-Sheet 3

INVENTOR.
HERMAN G. ADLER
BY
ATTORNEYS

Patented May 18, 1943

2,319,654

UNITED STATES PATENT OFFICE 2,319,654

GOVERNOR STRUCTURE

Herman G. Adler, Detroit, Mich., assignor to Novi Equipment Company, Novi, Mich., a corporation of Michigan Application October 27, 1941, Serial No. 416,760

12 Claims. (Cl. 264—17)

The present invention relates to a governor and more particularly to a governor combined with an engine gear in a manner to increase the efficiency of the governor, and to conserve space.

It is an object of the present invention to combine a novel governor structure with an especially formed engine gear so as to conserve space.

It is a further object of the invention to provide a governor in association with a rotary shaft, including centrifugally operated means located coaxially with the shaft for engagement with a spring pressed governor or control lever.

It is a further object of the invention to provide a novel form of centrifugal unit including cage-like ball driving means.

It is a further object of the invention to provide, in a governor of the type described, a bearing for transmitting thrust of centrifually operated means to a resiliently biased control lever, which comprises a ball rotatably mounted in a recess coaxially of a rotary shaft.

It is a further object of the invention to provide, in combination with a laterally recessed gear, centrifugal means including a plate or disc adapted to have limited clearance with respect to the outer walls of the recess, in which the disc is provided with transverse openings for preventing dashpot action.

Other objects of the invention will be apparent as the description proceeds, and when taken in conjunction with the accompanying drawings, wherein:

Figure 2 is a fragmentary end view of the governor construction, partly in section;

Figure 3 is a detail elevation of one element of the drive plate assembly;

Figure 4 is a section on the line 4—4, Figure 3;

Figure 5 is a section on the line 5—5, Figure 3;

Figure 1:
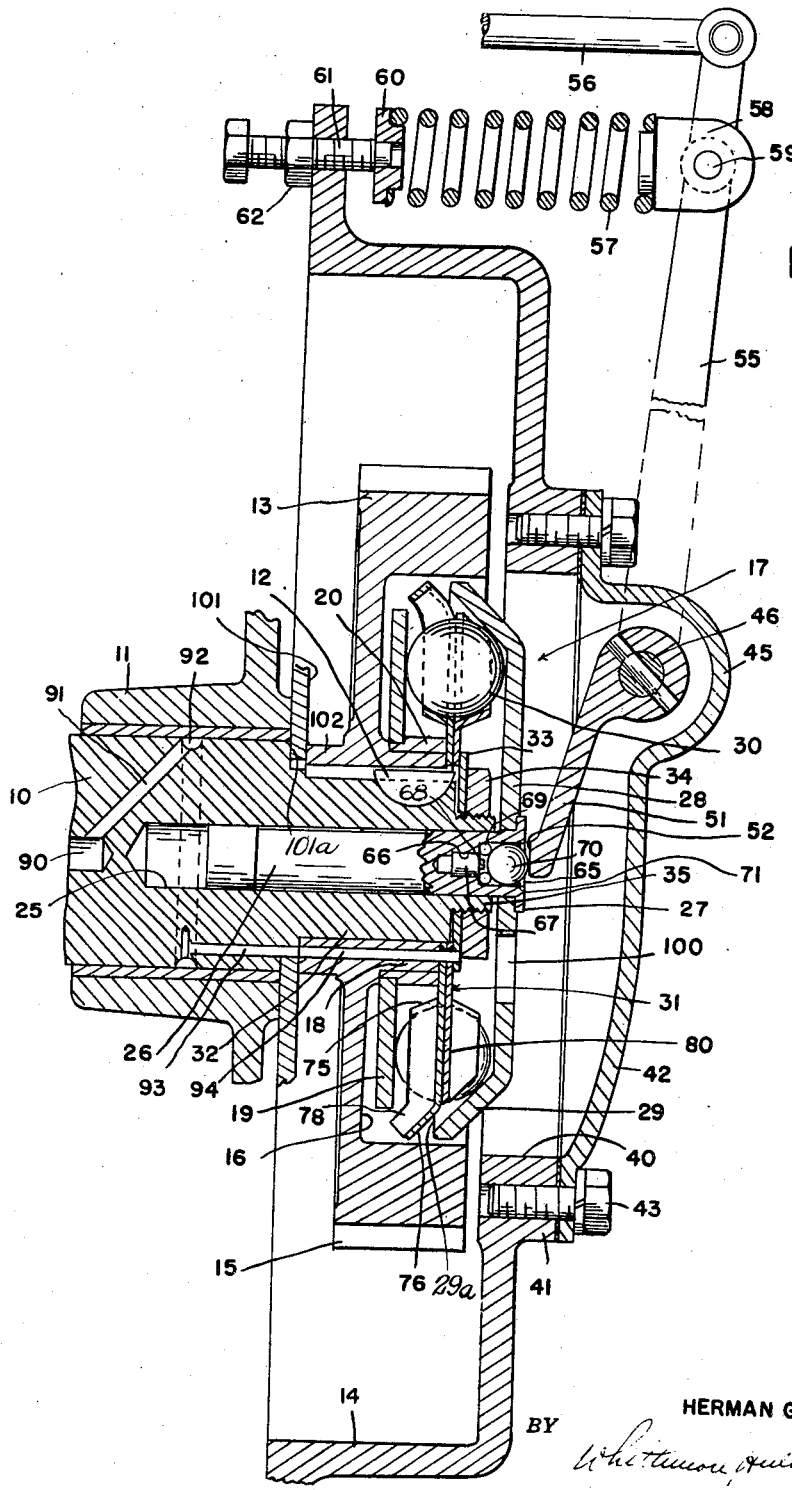
Figure 1 is a horizontal section through my complete governor assembly.
Figure 6:
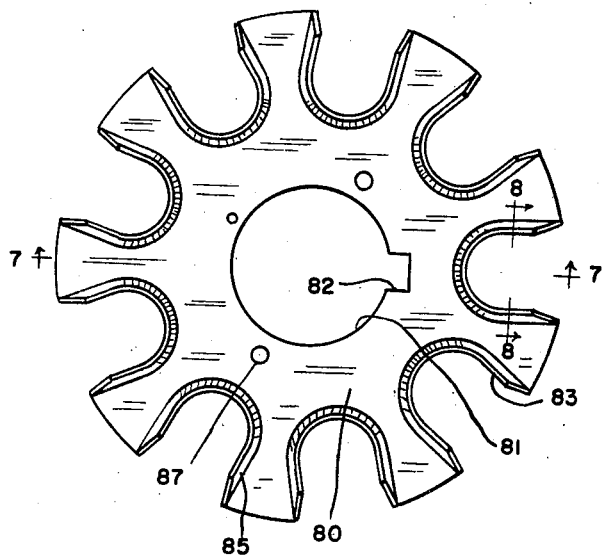
Figure 6 is a detail elevation of the other element making up my improved drive plate assembly.
Figure 8:
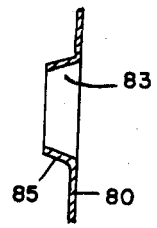
Figure 8 is a section on the line 8—8, Figure 6.
Figure 7:
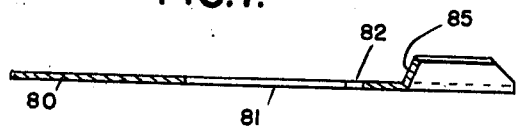
Figure 7 is a section on the line 7—7, Figure 6.

Referring first to Figure 1, I have illustrated at 10 a cam shaft of an internal combustion engine mounted for rotation in a crank case bearing 11 and having keyed or otherwise secured thereto, as indicated at 12, a gear 13.

A detachable engine gear case cover 14 is normally provided, and in the present instance I have modified this cover, as will subsequently be described. The gear 13 is provided with teeth 15, and is also formed with a laterally open annular recess 16 which houses a portion of the governing mechanism.

The governing mechanism comprises centrifugal means, indicated generally at 17, which will now be described.

The annular, laterally open recess 16 is formed so as to leave a hub portion 18 on the gear, and rotatably mounted on the hub portion 18 is a plate 19 and sleeve 20 which rotate together as a unit. The sleeve 20 may be spun or swedged to the plate 19.

The outer end of the cam shaft 10 has a counterbore 25 in which is rotatably received a shaft 26 that in turn is counterbored at its outer end, as will subsequently be described in detail, and has a flange 27 securing in place a second annular plate or disc 28. The plate 28 is secured against rotation on the shaft 26, as for example by providing a brazed connection between the flange 27 and the plate or disc 28.

The plate 28 is flat throughout its central portion but its periphery is inclined inwardly toward the plate 19 as indicated at 29.

As a result of this construction, a space 29a tapering in a radially outward direction is defined by the plate 19 and the inclined portion 29 of the plate 28.

Intermediate the plates 19 and 28 I provide a plurality of steel balls 30, and in the present instance I have illustrated nine such balls. A drive plate assembly indicated generally at 31 is provided for rotating the balls about the axis of the cam shaft 10 as the cam shaft rotates while the engine is running.

The drive plate assembly 31 will subsequently be described in detail, but for the present it is sufficient to note that the same is keyed or otherwise secured to a reduced portion 32 of the cam shaft and is held in place thereon by means of a washer 33 and a nut 34 threaded on a further reduced portion 35 of the cam shaft.

The engine gear case cover 14 is provided with a central opening 40 surrounded by a thickened portion 41, and a cover plate 42 is provided for the opening 40 and is secured to the thickened portion 41 by means of bolts 43. The cover plate 42 is shaped to provide an outwardly projecting inwardly open boss 45, in which is mounted a pin or shaft 46, best seen in Figure 2. The pin 46 is seated at one end, as indicated at 47, in a socket formed at one end of the boss and extends outwardly through an opening, as indicated at 48, at the other end of the boss. Suitable roller bearings for supporting the shaft 46 are indicated at 49, and an oil seal is provided as indicated at 50.

Pinned to the shaft 46 at substantially its mid portion and within the inwardly opening recess provided by the boss 45 is a short lever arm 51 which terminates at its free end in a flat portion 52, which is preferably hardened for a purpose which will later appear.

The outer end of the shaft 46 has secured thereto a lever 55 which is provided at its free end with a link 56 adapted to be connected in the usual manner to the carburetor throttle (not shown). Resilient means are provided for biasing the levers 55 and 51 in a clockwise direction so as to cause the flattened surface 52 of the lever 51 to engage a portion of the centrifugal means. This resilient means takes the form of a coil compression spring 57 having a seat 58 pivoted at 59 to the lever 55 and an adjustable seat 60 carried by an adjusting bolt 61 provided with a lock nut 62. As will be apparent, the compression of the spring and hence the adjustment of the governor may be varied by suitable adjustment of the bolt 61.

Figure 9:
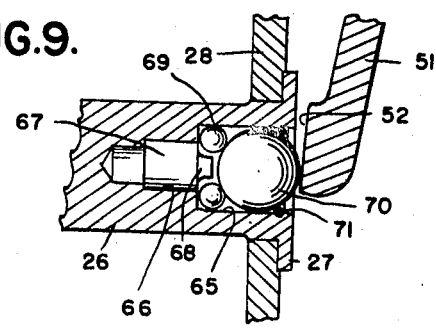
Figure 9 is an enlarged view showing the assembly of the thrust bearing of the centrifugal means.

Referring now to Figure 9, I have shown an enlarged view of the thrust bearing for the centrifugal means 17. The shaft 26 is provided at its free end with a relatively large counterbore 65 and a smaller counterbore 66. Seated within the counterbore 66 is a plug 67 having a forwardly extending projection 68 which projects beyond the bottom of the counterbore 65. A plurality of small ball bearings 69 are provided in the bottom of the counterbore 65 about the projection 68. A larger ball 70 is seated within the counterbore 65 and engages the plurality of ball bearings 69. The ball 70 is retained within the counterbore 65 by reason of a locking ring 71, and a portion of the ball 70 projects outwardly beyond the adjacent end of the shaft 26.

As will be apparent from an inspection of Figure 1, the ball 70 engages the flat hardened surface 52 of the lever 51 when the shaft 26 is moved outwardly in its counterbore by reason of radial outward movement of the balls 30 under centrifugal action. This movement of the parts is of course opposed by the compression spring 57, as will be readily apparent.

During operation of the governor, when the outer plate 28 moves axially as a result of radially outward movement of the balls 30, it causes lever 51 to rotate about its axis. As a result of this movement of the lever 51, a point on the surface 52, which engages the ball 70, moves in an arc. Therefore, if the ball 70 were not mounted for rotation, there would be rubbing and friction between this ball and the flat surface 52. However, since the ball 70 is free to rotate within the counterbore 65, and since it is further supported by a plurality of ball bearings 69, friction between the ball 70 and the surface 52 is reduced to a negligible quantity. This in turn reduces the side thrust on the shaft 26, making the governor performance highly responsive and eliminating lag.

The counterbore 65 is so small that the use of tools during assembly of balls 69 is impossible. In order to permit this assembly to be easily made without tools, the projection 68 causes the balls to assume their proper relationship. Accordingly, it is only necessary to introduce the proper number of ball bearings 69 into the counterbore 65 and to thereafter introduce the large ball 70 therein. The ball 70, in conjunction with the projection 68, will thereupon force the ball bearings 69 to assume their proper operating position, and the ring 71 may then be snapped into the groove provided therefor in the interior of the counterbore 65.

As is apparent, the governor may be assembled on the cam shaft 10 while the same is in horizontal position, and it is accordingly very desirable to introduce the governor balls 30 in properly assembled relation. I have found that this may be accomplished in a very satisfactory manner by providing a governor ball drive assembly which serves as a cage to retain the balls in properly assembled relation. Generally described, this cage comprises an annular plate having generally radially extending slots, the side walls of which are inclined inwardly so as to retain the balls 30 in place.

More specifically, the drive plate assembly 31 is made up of two separate metal plates 78 and 80 respectively. As shown, the plate 78 is provided with a central opening 79, adapted to receive the reduced portion 32 of the cam shaft 10. A keyway 72 is provided at the edge of the opening 79 whereby the plate 78 may be keyed upon the cam shaft to rotate therewith. A plurality of radially extending elongated slots 73 are provided in the plate 78, and flanges 75 which taper inwardly at a slight angle are provided throughout the edges of said slots. The slots 73 are closed at their opposite ends, and the outer edge of the plate 78 is bent upwardly as indicated at 76.

A plurality of oil holes 77 are also provided in the plate 78 for a purpose which will presently appear.

The plate 80 has a central opening 81 adapted to receive the reduced portion 32 of the cam shaft 10, and has a keyway 82 at an edge of the opening 81 so that the plate 80 may be keyed upon the cam shaft to rotate therewith. The plate 80 is of smaller diameter than the plate 78 and is provided with slots 83 which are open at their outer ends. The slots 83 are the same in number, spacing and general arrangement as the slots 73 previously referred to, and differ therefrom primarily in the fact that they are not closed at their outer ends. The plate 80 is provided throughout the edges of the slots 83 with inwardly tapering flanges 85, and is provided with oil holes 87, similar to the oil holes 77.

From the foregoing, it will be apparent that when the plates 78 and 80 are assembled as shown in Figure 1, the balls 30 located within the slots 73 and 83 will be retained in position by reason of the inward inclination of the flanges 75 and 85. Accordingly, in order to assemble the plates and balls, the balls are first positioned in the slots of one of the plates, the second plate is then brought into registry with the first plate, and the two plates are secured together as for example by spot welding. By virtue of this arrangement, the balls 30 are permanently retained in the drive plate assembly 31 but are freely movable in a radial direction an amount depending upon the length of the elongated slots thus provided. The foregoing construction is very desirable in assembling my improved governor structure, since the balls are first permanently assembled in the drive plate assembly therefor and may be introduced as a unit into the recess 16 formed in the gear 13.

Lubrication is provided for the governor through an oil passage 90, to which oil is introduced under pressure. A second oil passage 91 and an oil receiving annular groove 92 are formed in the cam shaft 10 and are adapted to receive oil in the order named from the oil passage 90. From the oil receiving annular groove 92 oil flows to a passage 93 through a similar passage 94 formed in the gear 13, thence through oil holes 77 and 87 formed in the plates 78 and 80 respectively, and thence outwardly through similar holes formed in the washer 33.

As best seen in Figure 1, the plate 28 has a very slight clearance with respect to the radially extending outward walls of the recess 16, and I have found that the provision of the transverse openings 100 in this plate are desirable to prevent any possibility of a dash-pot effect taking place upon inward or outward movement of the plate 28 under the influence of the centrifugal means 17 on the one hand, and the resiliently biased levers 55 and 51 on the other hand.

For holding the cam shaft 10 against axial displacement, I have provided a washer 101 between a shoulder 101a formed on the cam shaft and a second shoulder 102 formed on the gear 13.

With the foregoing description in mind, the assembly of the governor should be apparent. The gear 13 is mounted on the reduced portion 32 of the cam shaft 10. The sleeve 20 and its associated plate 19 are mounted on the inner hub portion of the gear 13. The drive plate assembly together with the preassembled balls 30 is placed on the reduced portion 32 of the cam shaft in keyed relation and is assembled thereon by the washer 33 and the nut 34. The shaft 26 with its preassembled ball 70 and its plate 28 is then slipped into the counterbore in the end of the cam shaft 10. This completes the assembly of the centrifugal part of the governor.

In like manner the operation of the governor should be readily apparent. Upon rotation of the cam shaft 10 a like rotation is imparted to the drive plate assembly 31, thus rotating the balls 30 about the axis of the cam shaft 10. As a result of the centrifugal action thus developed, the balls 30 tend to move radially outwardly, such movement being limited by the elongated slots 13 and 83 which receive the balls. Outward movement of the balls tend to move the plate 28 axially, thus moving the shaft 26 also axially of the cam shaft 10. This motion of the shaft 26 is opposed by the lever 51, which is resiliently urged in a clockwise direction by the compression spring 57. Accordingly, the radially outward movement of the balls 30 is arrested at a point dependent upon the geometry of the governor. The governor is lubricated by oil passing through the oil passages 91, 92, 93, 94, 77 and 87.

My improved governor not only is characterized by the small amount of space which it takes up but also by its simplicity of design and construction. Attention is also directed to the fact that the thrust developed by the centrifugal means is applied coaxially of the cam shaft. This contributes to the efficiency of the operation and prevents the possibility of any unbalanced force acting on different ones of the centrifugal balls 30.

It may be pointed out that during operation of the governor while the gear 13 is rotating, the plates 19 and 28 will normally pick up the same speed of rotation as the balls 30 but that upon change in speed of the engine, the plates 19 and 28 may have a slight differential rotation in order that the balls 30 may roll smoothly to a new position.

While I have illustrated and described in considerable detail a single preferred embodiment of my improved governor, it will be understood that this has been done solely to enable those skilled in the art to practice the invention, the scope of which is indicated by the appended claims.

What I claim as my invention is:

1. In a governor, a ball drive assembly comprising two annular plates secured together in surface to surface relation, one of said plates having radially extending elongated slots provided with closed ends and provided at the edges of said slots with inwardly inclined flanges, the second plate being smaller in diameter than the first mentioned plate and having radially extending elongated slots closed at their inner ends and open at their outer ends, the slots in the second plate registering with the slots in the first mentioned plate, the second mentioned plate being provided at the closed inner end and at opposite side edges of the slots therein with inwardly inclined flanges, and balls freely movable within the registering slots in said plates and guided and retained against displacement by the inclined flanges of said plates.

2. In a governor, a ball drive assembly comprising two annular plates secured back to back, one of said plates having radially extending elongated slots provided with closed ends and provided completely around the edges of said slots with inwardly inclined flanges, the second plate having radially extending elongated slots closed at their inner ends and open at their outer ends, the slots in the second plate registering with the slots in the first mentioned plate, the second mentioned plate being provided at the closed inner end and at opposite side edges of the slots therein with inwardly inclined flanges, and balls freely movable within the registering slots in said plates and guided and retained against displacement by the inclined flanges of said plates.

3. In a governor of the type employing a plurality of radially movable balls, a rotary driver therefor comprising a plate structure having a plurality of substantially radially arranged, elongated slots, said slots having side walls of substantial thickness converging inwardly and being closed at their ends, whereby balls assembled therein are radially movable in said slots but are retained against removal from said slots.

4. In a governor of the type employing a plurality of radially movable balls, a rotary driver therefor comprising a plate structure of generally flat, annular shape having substantially radially arranged, elongated slots, flanges at the sides of said slots forming ball-retaining guides, the outer ends of said slots being closed to prevent removal of balls therefrom.

5. In a governor of the type employing a plurality of radially movable balls, a rotary driver therefor comprising a pair of generally flat, sheet metal plates abutting together and having registering, elongated, substantially radially arranged, ball receiving slots, each of said plates having flanges at the sides of said slots extending outwardly away from the other of said plates and converging slightly inwardly of said slots, the flanges of both of said plates forming ball-retaining guides.

6. In a governor of the type employing a plurality of radially movable balls, a rotary driver therefor comprising a pair of generally flat, sheet metal plates abutting together and having registering, elongated, substantially radially arranged, ball receiving slots, each of said plates having flanges at the sides of said slots extending outwardly away from the other of said plates and converging slightly inwardly of said slots, the flanges of both of said plates forming ball-retaining guides, the outer end of the slots of one of said plates being closed.

7. In a governor, a ball drive assembly comprising two annular plates rigidly secured together, one of said plates having radially extending elongated slots provided with closed ends and provided at the side edges of said slots with inwardly inclined flanges, the second plate having radially extending elongated slots closed at their inner ends and open at their outer ends, the slots in the second plate registering with the slots in the first mentioned plate, the second mentioned plate being provided at opposite side edges of the slots therein with inwardly inclined flanges, and balls freely movable within the registering slots in said plates and guided and retained against displacement by the inclined flanges of said plates.

8. In a governor of the type employing a plurality of radially movable balls, a rotary driver therefor comprising a pair of metal plates secured together and having registering, elongated, substantially radially arranged, ball receiving slots, each of said plates having flanges at the sides of said slots extending outwardly away from the other of said plates and converging slightly inwardly relative to said slots, the flanges of both of said plates forming ball-retaining guides.

9. In a governor of the type employing a plurality of radially movable balls, a rotary driver therefor comprising a pair of metal plates secured together and having registering, elongated, substantially radially arranged, ball receiving slots, each of said plates having flanges at the sides of said slots extending outwardly away from the other of said plates and converging slightly inwardly relative to said slots, the flanges of both of said plates forming ball-retaining guides, the outer end of the slots of one of said plates being closed.

10. In a governor, a ball drive assembly comprising two plates secured together in opposed relation, one of said plates having radially extending elongated slots provided with closed ends and provided at the edges of said slots with inwardly inclined flanges, the second plate having radially extending elongated slots closed at their inner ends and open at their outer ends, the slots in the second plate registering with the slots in the first mentioned plate, the second mentioned plate being provided at the closed inner end and at opposite side edges of the slots therein with inwardly inclined flanges, and balls freely movable within the registering slots in said plates and guided and retained against displacement by the inclined flanges of said plates.

11. In a governor, a ball drive assembly comprising two plates secured together in opposed relation, one of said plates having radially extending elongated slots provided with closed ends and provided completely around the edges of said slots with flanges, the second plate having radially extending elongated slots closed at their inner ends and open at their outer ends, the slots in the second plate registering with the slots in the first mentioned plate, the second mentioned plate being provided at the closed inner end and at opposite side edges of the slots therein with flanges, and balls freely movable within the registering slots in said plates and guided and retained against displacement by the flanges of said plates.

12. In a governor, a ball drive assembly comprising two plates secured together in opposed relation, one of said plates having radially extending elongated slots provided with closed ends, the second plate having radially extending elongated slots closed at their inner ends and open at their outer ends, the slots in the second plate registering with the slots in the first plate, said plates being provided at the edges of the slots therein with cooperating guide and retaining means for balls, and balls freely movable within the registering slots in said plates and guided and retained against displacement by the cooperating means aforesaid.

HERMAN G. ADLER.